United States Patent [19]
Davies et al.

[11] Patent Number: 5,586,311
[45] Date of Patent: Dec. 17, 1996

[54] OBJECT ORIENTED DATA ACCESS AND ANALYSIS SYSTEM

[75] Inventors: Kathleen M. Davies, Farmers Branch; Mark M. Kunichika, Dallas; Darren B. Dayley, Fort Worth; Jeffery D. Donaldson; Luke J. Temprine, both of Coppell; Mikael H. Livingston, Euless; Nurman Haripin, Carrollton; Angelo B. Nasche, Lewisville; David B. Batchelor, Dallas; Bernhard O. Bauerle, Euless, all of Tex.

[73] Assignee: American Airlines, Inc., Fort Worth, Tex.

[21] Appl. No.: 196,412

[22] Filed: Feb. 14, 1994

[51] Int. Cl.$^6$ .................................................. G06F 17/30
[52] U.S. Cl. ..................... 395/561; 345/326; 345/548; 364/974.6; 364/282.1
[58] Field of Search ................................. 395/600, 650, 395/700, 159, 161, 500

[56] References Cited

U.S. PATENT DOCUMENTS

| | | | |
|---|---|---|---|
| 4,506,326 | 3/1985 | Shaw et al. | 395/700 |
| 4,692,858 | 9/1987 | Redford et al. | 395/157 |
| 5,019,961 | 5/1991 | Addesso et al. | 364/192 |
| 5,317,732 | 5/1994 | Gerlach et al. | 395/600 |
| 5,418,950 | 5/1995 | Li et al. | 395/600 |
| 5,421,008 | 5/1995 | Banning et al. | 395/600 |

FOREIGN PATENT DOCUMENTS 0477152  3/1992  European Pat. Off. .

OTHER PUBLICATIONS

Rizzo et al., "DARWIN: Merrill Lynch Develops a New Workstation Based on Windows 2.03", *Microsoft Systems Journal*, Jul., 1988, pp. 01–12.

Czejdo et al., "A Visual Query Language for An ER Data Model", 1989 IEEE Workshop on Visual Languages, Rome, Italy, 4–6 Oct. 1989.

Czejdo et al., "A Graphical Data Manipulation Language for an Extended Entity–Relationship Model", *Computer*, vol. 23, No. 3, Mar. 1990, pp. 26–36.

Angelaccio et al., "QBD*: A Graphical Query Language With Recursion", *IEEE Transactions on Software Engineering*, vol. 16, No. 10, Oct. 1990, pp. 1150–1163.

Staes et al., "A Graphical Query Language for Object Oriented Databases", *Proceedings. 1991 IEEE Workshop on Visual Languages*, Kobe, Japan, 8–11 Oct. 1991, pp. 205–210.

Catarci et al., ("Iconic and Diagrammatic Interfaces: An Integrated Approach", *Proceedings. 1991 IEEE Workshop on visual Languages*, Kobe, Japan, 8–11 Oct. 1991, pp. 199–204.

Whang et al., "Two–Dimensional Specification of Universal Quantification in a Graphical Database Query Language", *IEEE Transactions on Software Engineering*, vol. 18, No. 3, Mar. 1992, pp. 216–224.

Massari et al., "An Iconic Query System With Intensional Feedback", *Proceedings 1993 Symposium on Visual Languages*, Bergen Norway, 24–27 Aug. 1993, pp. 386–388.

(List continued on next page.)

*Primary Examiner*—Thomas G. Black
*Assistant Examiner*—Paul R. Lintz
*Attorney, Agent, or Firm*—Herbert J. Hammond

[57] ABSTRACT

A system for accessing and analyzing data through a central processing unit. The system includes a non-modal user interface to provide a user access to the system. A number of application graphics objects allow the user to visually interact with a plurality of analysis objects through the non-modal user interface. The plurality of application analysis objects allow a user to interactively create an analysis network for analyzing one or more databases. A plurality of application data access objects interpret the analysis network and allow the system to access required databases and to generate structure query language required to access and analyze the databases as defined within the analysis network.

2 Claims, 6 Drawing Sheets

OTHER PUBLICATIONS

Erland Jungert, "Towards a Visual Query Language for an Object Oriented Geographical Information System", *Proceedings of the 1990 IEEE Workshop on Visual Languages,* Skokie, Illinois, 4–6 Oct. 1990, pp. 132–137.

McIntyre et al., "Visual Tools for Generating Iconic Programming Environments", *1992 IEEE Workshop on Visual Languages,* Seattle, Washington, 15–18 Sep. 1992, pp. 162–168.

Koegel et al., "Visual Programming Abstractions for Interactive Multimedia Presentation Authoring", *1992 IEEE Workshop on Visual Languages,* Seattle, Washington, 15–18 Sep. 1992, pp. 231–233.

Mohan et al., "A Visual Query Language for Graphical Interaction With Schema–Intensive Databases", *IEEE Transactions on Knowledge and Data Engineering,* vol. 5, No. 5, Oct., 1993.

Bruce F. Webster, *The NeXT Book,* Addison–Wesley Publishing Company, (Reading, Mass., 1989) pp. 122.

Tsuda et al., "Iconic Browser: An iconic Retrieval System for Object–Oriented Databases", *1989 IEEE Workshop on Visual Languages,* Rome, Italy, 4–6 Oct. 1989.

R. G. Epstein, "A Graphical Query Language For Object-oriented Data Models", *Proceedings of the 1990 IEEE Workshop on Visual Languages;* Skokie, Illinois, 4–6 Oct. 1990, pp. 36–41.

OBJECT ORIENTED DATA ACCESS AND ANALYSIS SYSTEM

TECHNICAL FIELD

The present invention relates to data access and analysis systems, and more particularly to an object oriented, interactive data access and analysis system.

BACKGROUND OF THE INVENTION

Presently, computerized request and analysis of data are handled in a variety of ways. An individual request may be handled on a case by case basis by the management information systems department, or a user may obtain the required data or analysis by using various programming languages. A user may also extract the data from a spreadsheet or utilize various types of query tools.

For in-depth data analysis, these options are often time consuming and frustrating to a user. These types of requests and analysis require the user to learn a programming language, understand and manage data structures, search through a long list of report/file requests, search through a long list of queries, learn query language syntax, and remember previously used steps in order to repeat a previously executed analysis. The required knowledge level limits the number of individuals able to analyze and/or request data.

Each of the above-mentioned methods of data request and analysis are normally utilized separately, often from different computing environments. This prevents users of computing systems and databases from completing an analysis in a timely fashion due to the time required to switch between computing environments. Present systems providing comprehensive access and analysis are normally supported from a single desktop computing environment utilizing modal, procedural query tools. In existing products an analyst constructs, executes and saves queries. A single analysis may require the construction of many queries, each of which must be saved, located and executed in the correct sequence when the analysis is repeated. With typical query tools, the business analyst's usual array of reports, files, and extract programs are replaced with an array of queries. Additionally, any path of reasoning taken during an analysis must be remembered when the analysis is repeated. Thus, a need has arisen for a data analysis and access system that provides a user the ability to analyze data without requiring in-depth data structure and query language knowledge.

SUMMARY OF THE INVENTION

The present invention overcomes the foregoing and other problems with an object oriented system for accessing and analyzing data through a central processing unit such as a desktop computer. This system allows a user to carry out complex and multilevel analysis upon various types of relational databases without requiring the user to first obtain in-depth knowledge of database structure and structured query language syntax requirements. The system provides a non-modal user interface allowing a user to interactively operate the system through a plurality of graphics objects.

The graphics objects provide the user with the means to visually manipulate a number of analysis objects for creating an analysis networks. The graphics objects generate a number of icons representative of the various analysis objects and databases on a computer display of a central processing unit. By utilizing mouse actuated drag and drop techniques, databases are moved into the analysis network and analysis functionalities are applied to the database by placing various analysis objects into the analysis network and interconnecting them.

Analysis control objects interpret the generated analysis network and provide access to the data designated by the generated analysis network. The data access objects obtain physical data structure, logical data names and logical variable classifications from a metadata management facility. The data access objects also generate the structured queried language controlling the access and analysis of selected databases in response to the data analysis network.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
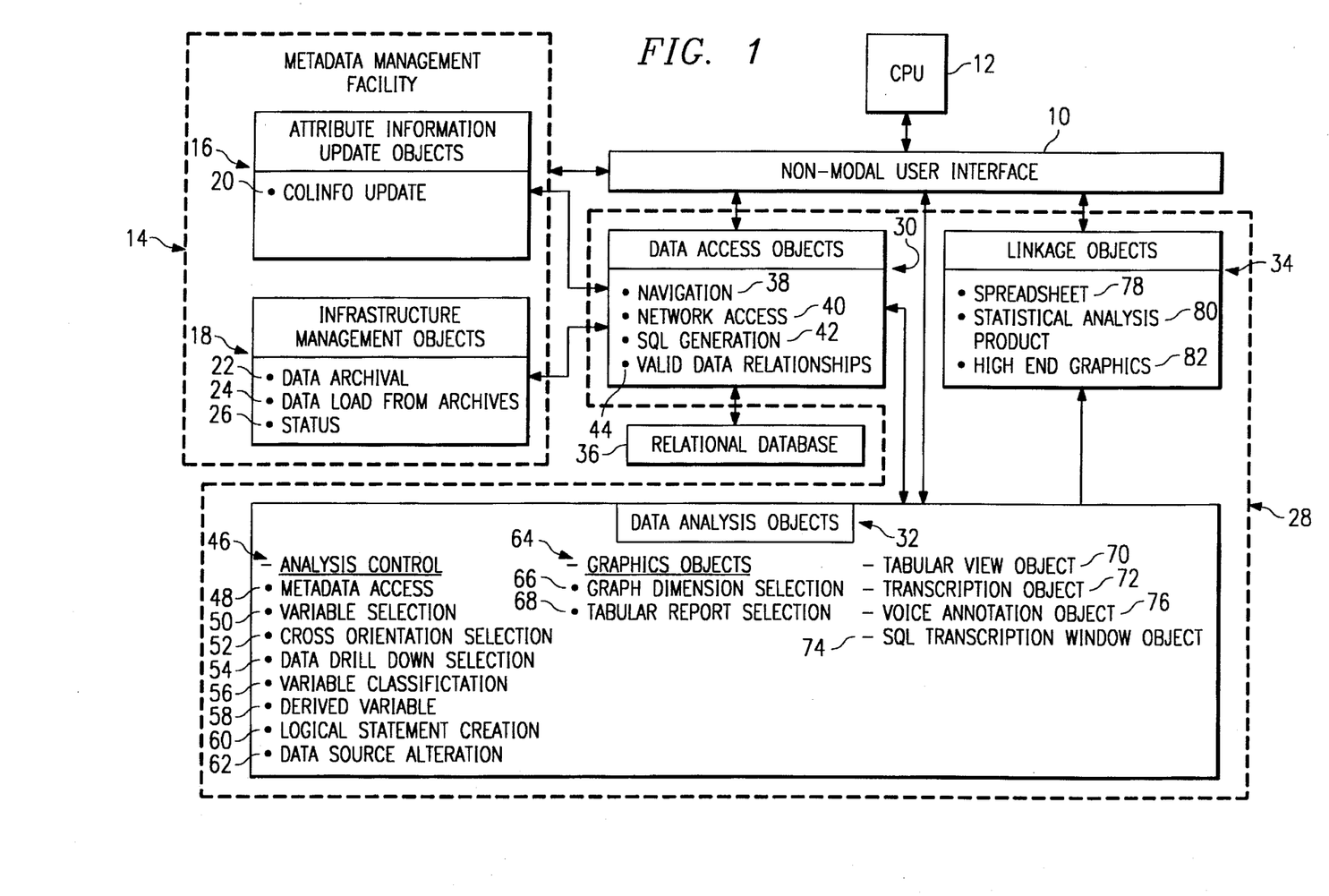
FIG. 1 is a block diagram illustrating the various components of the system of the present invention.

Referring now to the drawings and more particularly to FIG. 1, there is illustrated a block diagram of the object oriented data access and analysis system. A non-modal user interface 10 provides the system access to a central processing unit (CPU) 12, communicating with a computer network capable of accessing information over a network node. The interface 10 is non-modal because the "modes of operations" of the system are not apparent to an end user. For example, a user is not required to learn which pull down menu options are valid for each step in the development of analysis. No cascading buttons, pull down menus, pop up menus, and few dialogues are presented to a user. The complexity to be managed by a user of a non-modal interface is drastically reduced by utilizing mouse operations and object editors to directly specify requests. These will be more fully discussed in a moment.

The metadata management facility 14 provides a variety of applications for processing and managing metadata (data about data or databases) stored within the system. The metadata management facility 14 is comprised of the attribute information update objects 16 and the infrastructure management objects 18. The attribute information update objects 16 provide updates on the status of databases being accessed by the system. Visual clues including icon colors indicate the availability of databases which are archived or "in-process" status. The colinfo update object 20 provides update information about columns of databases accessed by the system. The infrastructure management objects 18 provide data status tracking within the system. The data archival object 22 points to the locations of data stored within the system. The data load from archives object 24 provides mechanisms for retrieving archived data from the location indicated by the data archival object 22 for use by the system. A status object 26 tags all data within the system and determines the status of the data at any given time (transfers, loads, etc.).

The application objects 28 perform a variety of graphics generation, analysis functions and data access procedures. The application objects 28 encapsulate the details of: interacting with the computer user, obtaining data structure via metadata, generating Structured Query Language (SQL), accessing network infrastructure, displaying/interacting with graphical displays, and linking to third party products. The application objects 28 drive the CPU 12, which communicates with the computer network (not shown) to access information on a network node as specified by the user via the non-modal user interface 10. The application objects 28 include data access objects 30, data analysis objects 32 and linkage objects 34. All of these applications objects 28 interact with each other, the user interface 10, the metadata management facility 14, and various relational databases 36 to provide the user with a comprehensive, object oriented data access and analysis system.

The data access objects 30 generate structured query language (SQL) and hide database structure. Access to the data structure is not achieved through normal depiction methods, such as, tables, table names, column names or related data entities. The data access objects 30 obtain pertinent data descriptions from the metadata management facility 14, not the user. The navigation object 38 uses an object oriented language, such as Smalltalk®, as opposed to utilizing SQL language exclusively, to access and manipulate the data. The use of an object oriented language provides various navigational extensions to SQL via the objects. The network access object 40 permits the system to access network infrastructure and obtain reports of network operations via the non-modal user interface 10. The network access object 40 also permits a user to access remotely stored database information. The SQL generation object 42 generates structured query language (SQL) in response to an analysis network prepared by the user or in response to a previously constructed analysis network. SQL causes the CPU 12 to access and analyze data as defined by the analysis network. The construction of analysis networks will be more fully discussed in a moment. The automatic generation of SQL represents a vast improvement over prior systems requiring an analyst to generate their own SQL in order to analyze or access data. The valid data relationships object 44 automatically defines the relationships between data and databases used by the system. The valid data relationships object 44 frees a user from having to predefine these relationships before data access and analysis may be initiated.

The data analysis objects 32 permit a user to analyze and access databases using a variety of object tools. The system provides analysis control objects 46 for manipulating data to perform a particular analysis. The analysis control objects 46 are used to generate an analysis network. The analysis network determines how the data is accessed and analyzed. An analysis network can include analysis control objects 46 such as: data sources, filters, aggregators, sorts, matches, graphs, and tabular views. The objects 46 are configured into an analysis network via simple graphics interface operations. An analysis network is easy to use and once configured may be reused in subsequent analysis or used to create different analysis. The analysis network can be stored for private use or placed in an exchange for group sharing. Stored analysis network contains the specification and artifacts (annotations, graphics, tabular views, etc.) of the analysis.

The generation of the analysis networks are facilitated by a plurality of object functions that manually or automatically create the paths of an analysis network. A metadata access function 48 provides access to the metadata management facility 14 to obtain physical data structure, logical data names and logical variable classification. A data projection and multianalysis function 50 provides a user with the ability to compare a single variable to a plurality of other variables in a rapid one to one fashion. The user first defines the plurality of variables to the function 50 and each of the variables are accessed and projected to the function. By repetitively actuating the variable selection function 50 the user is able to generate multiple graphic displays and compare each of the plurality of displays to a single variable.

A cross orientation (or jump across) selection function 52 inserts a new view of data at a same aggregation level for an existing data selection and automatically generates a new network path based upon the new view of data. A data drill down selection function inserts a new view of data at a lower aggregation level 54 than the existing selection of data and automatically generates a new analysis network path.

A variable classification function 56 allows a user to personalize categories of preexisting variables. A user designates a number of categories and place variables in these categories as desired. The user is then able to recall the variables by category. A derived variable function 58 provides a user with the means to define new variables using existing variables, arithmetic operators and basic statistics. Variables are created visually via a specification palette. The equation arithmetic operators and variables are depicted as network nodes attached by connectors within the analysis network. In response to the nodes and connectors of the analysis network, the derived variable function 58 generates the equations representing the defined variables. A logical statement creation function 60 includes means for generating logical statements comprised of logical operators and variables. The logical operators and variables are generated in response to the network nodes and connectors of the analysis network. A data source alteration function 62 changes a data source atop an analysis network and reexecutes the network in response to the new data source.

Graphics objects 64 allow the user to interactively prepare an analysis network and visually manipulate the analysis control objects 46 using drag and drop techniques through the user interface 10. The graphics objects 64 further includes a graph dimension selection function 66 using drag and drop techniques to set physical graph dimensions (for example, axis). A tabular report selection function 68 uses drag and drop techniques to set up a tabular report column headings.

A tabular view object 70 permits the user to view analyzed data in tabular form. A transcription object 72 creates a transcription of the completed network analysis in English-like form and maintains a record of any analysis produced. The transcription describes each step of the analysis and the data accessed. Also, the analysis network itself depicts the work completed. If desired, the SQL generated by an analysis can be viewed through a SQL transcription window object 74. Finally, a voice annotation object 76 combines audio notes created by the user with analytical results from an analysis network. The audio notes are entered through a microphone (not shown) attached to the CPU 12.

The linkage objects 34 provide product links, such as spreadsheet 78, statistical analysis product 80 and high end graphics 82 between the system and outside sources.

Figure 2:
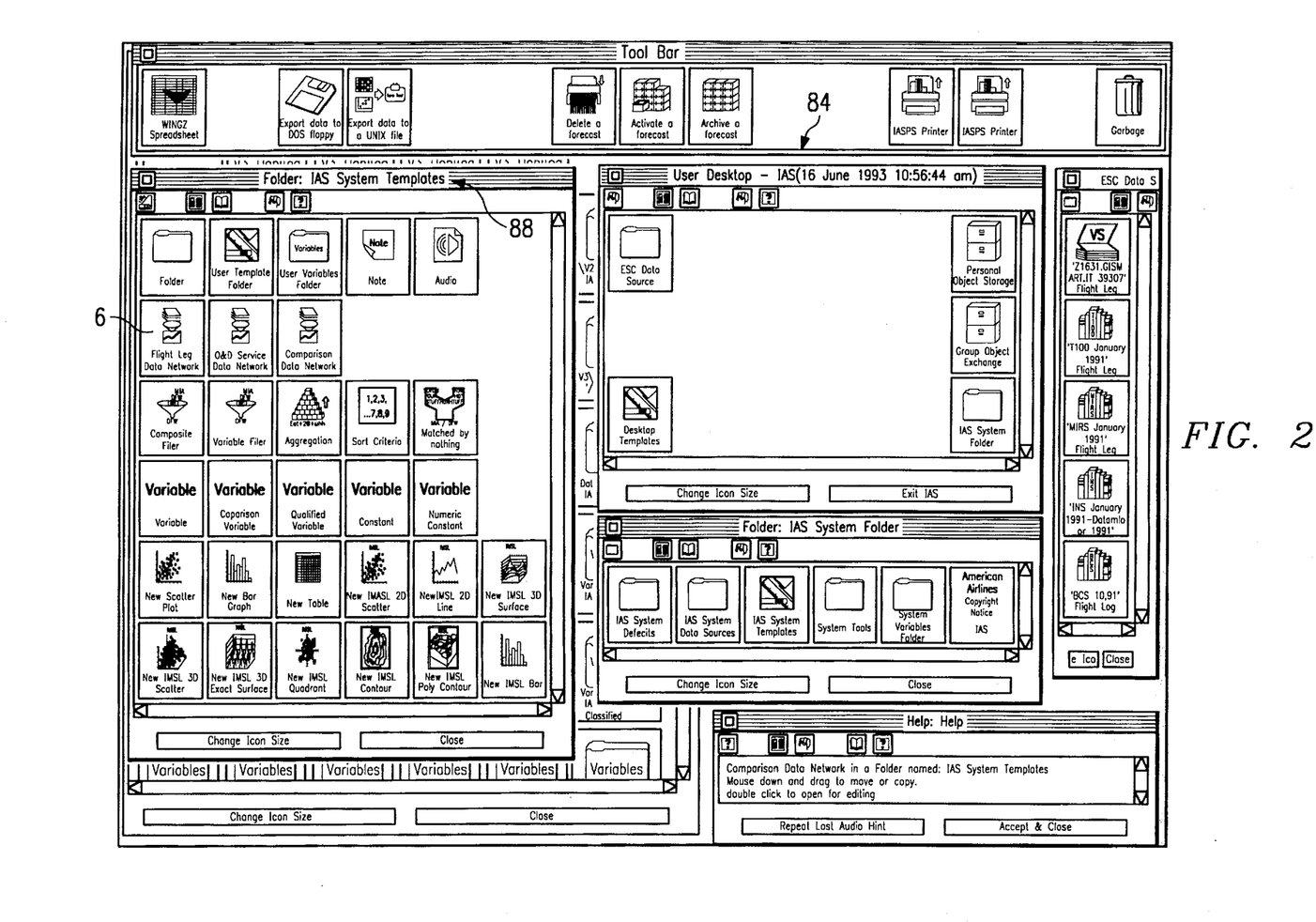
FIGS. 2 through 5 illustrate various on-screen representations of the graphical user interface used by the system.
Figure 3:
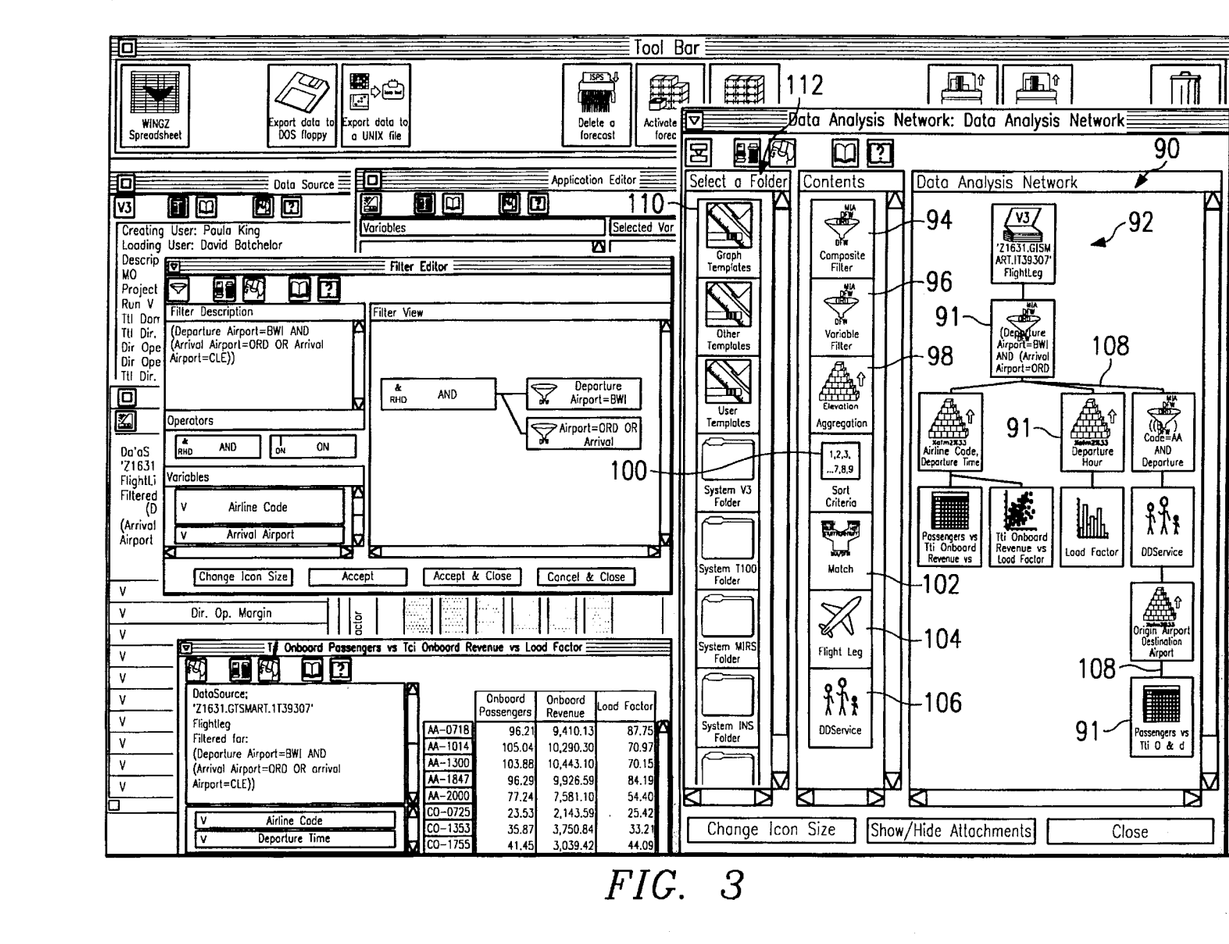
Figure 4:
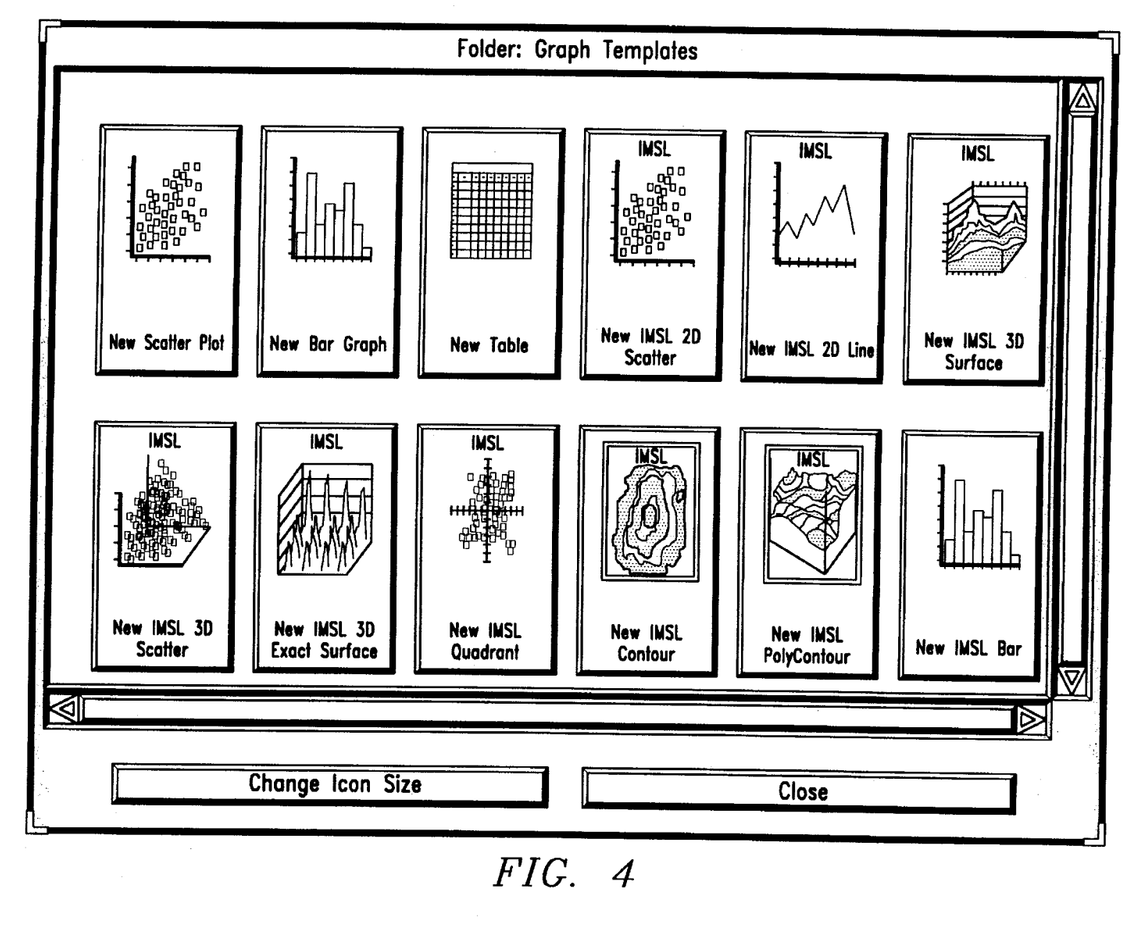

Referring now to FIGS. 2 through 4, there are illustrated several screens of a graphical user interface of the present system. The following discussion provides an example of one use of the system. A user begins by opening the "User Desktop" 84 shown in FIG. 2. The user drags and drops a data network onto the user desktop 84. (For example, the "Flight Leg Data Network" 86 in the "Folder: IAS System Templates" window 88.) A double click mouse action on the "Flight Leg Data Network" 86 reveals an analysis network such as that shown in the "Data Analysis Network: Data Analysis Network" window 90 shown in FIG. 3.

The user next proceeds to modify or build from scratch the analysis network by dragging and dropping object tools 91 (icons) into the data analysis network 92. For example, object tools 91 shown in FIG. 3 include composite filter 94, variable filter 96, aggregation 98, sort criteria 100, match 102, flight leg 104 and DD service 106. Object tools 91 are dragged and dropped into the data analysis network 92 and connected by clicking on one object tool icon 91 and then drawing a line 108 to a second icon. The object tools 91 are analysis control objects 40. The object tools 91 and connecting lines 108 of the analysis network 92 actuate the generation of arithmetic equations and logical statements, and the generation SQL statements as discussed with respect to FIG. 1.

Graphs are created by double clicking on graph templates 110, shown in the Select a Folder column 112 of the window 90. Graph selections such as those depicted in FIG. 4 appear and a particular graph may be dragged and dropped into the data analysis network 92 and connected into the analysis network via lines 82.

Figure 5:
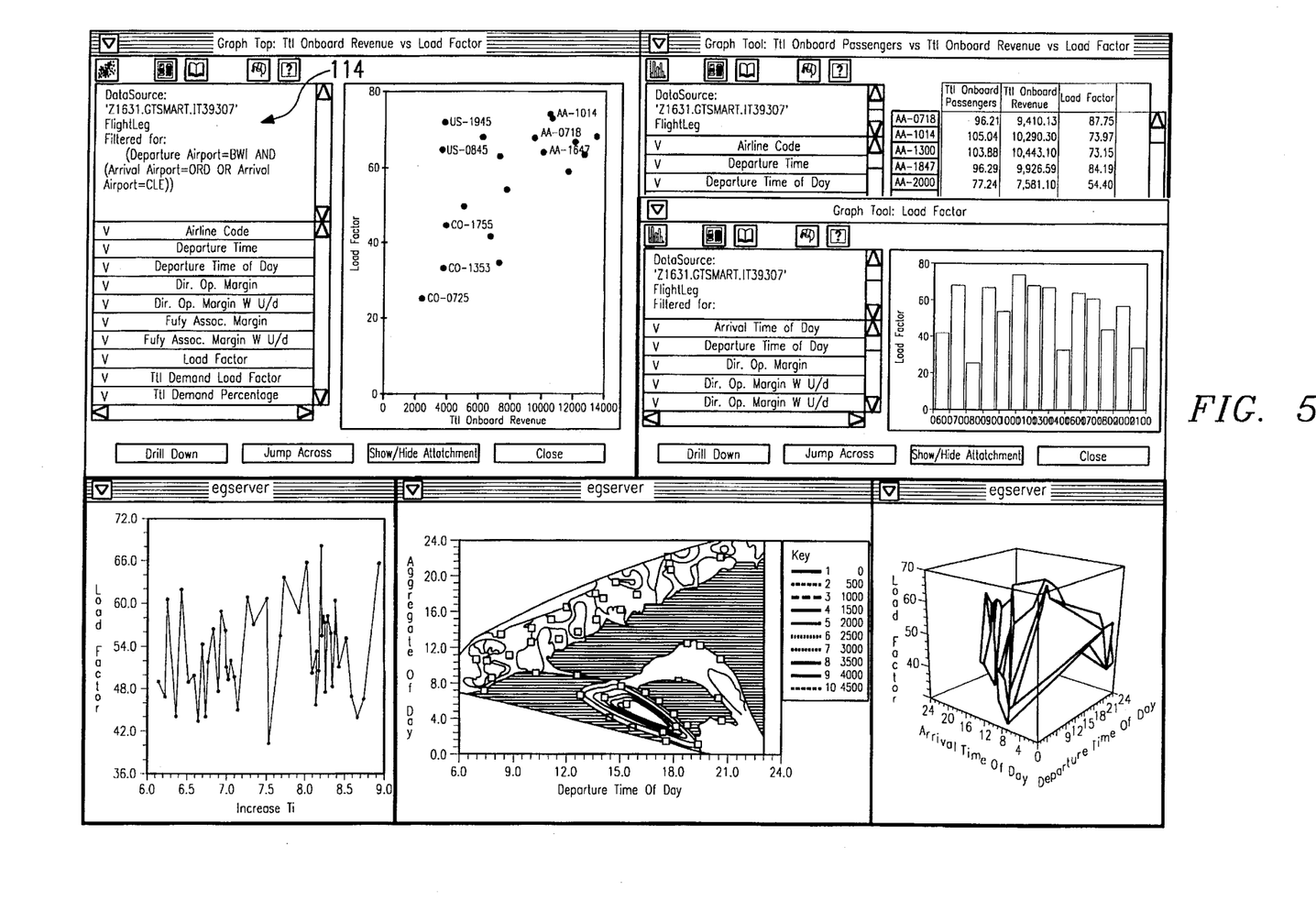

FIG. 5 illustrates the transcription window 114, described with respect to the transcription object 72. As can be seen, the transcription object creates a record of the analysis network created within the data analysis network window 90.

Figure 6:
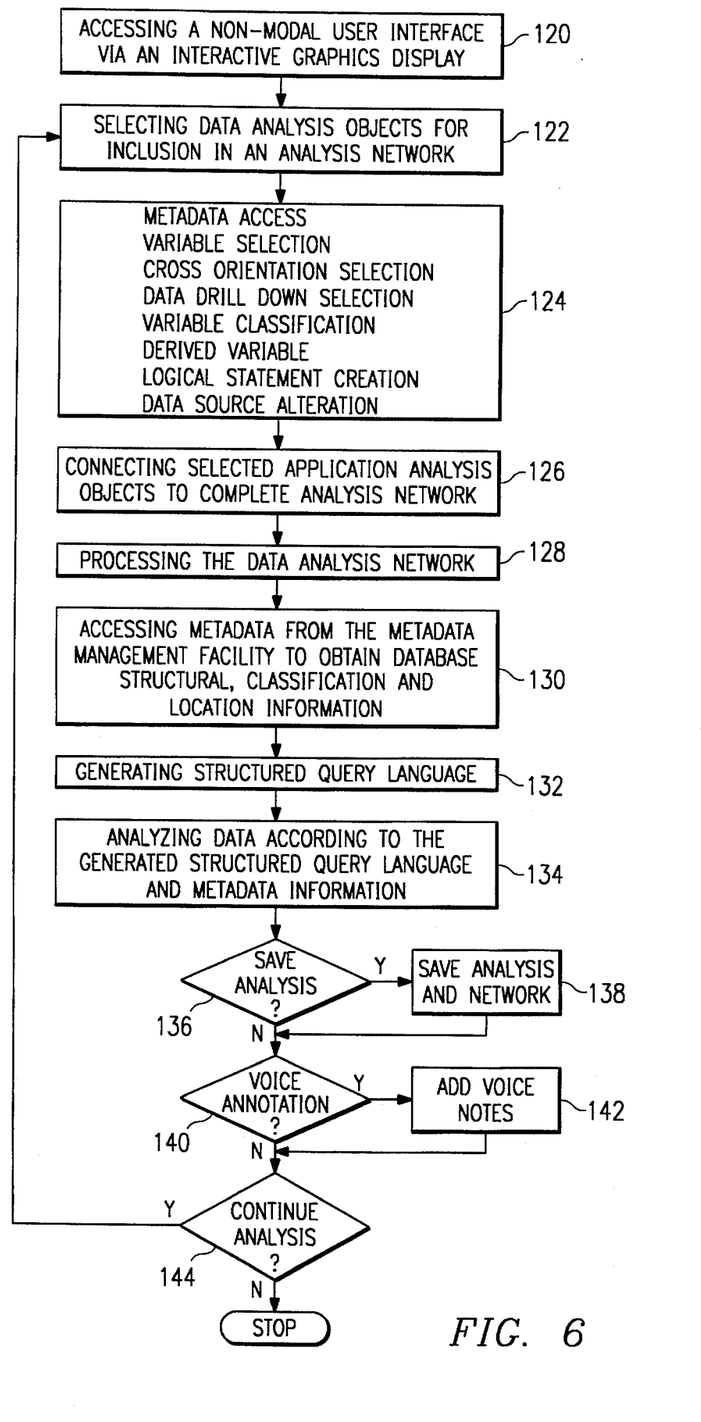
FIG. 6 is a flow diagram illustrating the method by which the object oriented data access and analysis system performs analysis on data.

Referring now to FIG. 6, there is illustrated the method by which the system performs an analysis of a database. Initially, the user accesses the system through the nonmodal user interface 10 via an interactive graphics display comprised of the various graphics objects 64 at step 120. The user next selects at step 122 the various data analysis objects desired to be included in the analysis network using a graphic interface drag and drop technique. The data analysis network may include any of the analysis control objects 46, discussed previously with respect to FIG. 1 and as shown at step 124. After the desired data analysis objects are selected, the objects are connected at step 126 via a mouse actuated point and click technique to form a completed analysis network.

The analysis network is processed at step 128 and the metadata management facility accessed at step 130 to obtain database structural, classification, and location information required to complete the analysis defined by the analysis network. The structured query language is generated at step 132 to perform the analysis defined by the analysis network. The metadata information and generated structured query language are combined at step 134 to generate the analysis results required by the analysis network.

At inquiry step 136 a determination is made whether to save the analysis and analysis network generated by the user and, if desired, the analysis and analysis network are saved at step 138. A decision is made at inquiry step 140 whether to add voice annotations to a generated analysis network and analysis results, and the voice notes may be added at step 142. A user may then continue data analysis from inquiry step 144 by returning to select new or additional data analysis objects at step 122 or the procedure may be discontinued.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

We claim:

1. A system for accessing and analyzing data through a central processing unit, said system comprising:

a non-modal user interface for providing a user access to the system;

a plurality of application analysis objects for creating an analysis network, said analysis network comprised of user selected nodes and user interactively created connections where the nodes and connections determine the analysis of a selected database and including cross-orientation selection means for reanalyzing a new view of data at the same aggregate level and for generating a new analysis network path in response to the reanalysis;

a plurality of application graphics objects for interactively manipulating the plurality of analysis objects through the non-modal user interface; and a plurality of application data access objects for accessing databases and for generating structured query language in response to the analysis network.

2. A system for accessing and analyzing data through a central processing unit, said system comprising:

a non modal user interface for providing a user access to the system;

a plurality of application analysis objects for creating an analysis network, said analysis network comprised of user selected nodes and user interactively selected connections where the nodes and connections determine the analysis of a selected database and including data drill down selection means for reanalyzing a new view of data at a lower aggregation level than an existing selection of data and for generating a new analysis network path in response to the reanalysis;

a plurality of application graphics objects for interactively manipulating the plurality of analysis objects through the non-modal user interface; and a plurality of application data access objects for accessing databases and for generating structured query language in response to the analysis network.

\* \* \* \* \*

UNITED STATES PATENT AND TRADEMARK OFFICE
CERTIFICATE OF CORRECTION

PATENT NO. : 5,586,311
DATED : December 17, 1996
INVENTOR(S) : Kathleen M. Davies, et al.

It is certified that error appears in the above-indentified patent and that said Letters Patent is hereby corrected as shown below:

Col. 3, line 13, change "applications" to --application--;
 line 65, change "are" to --is--;
Col. 4, line 3, change "A data" to --A variable selection (data projection and multianalysis)--;
Col. 5, line 17, delete "40";
 line 27, change "82" to --108--;
Col. 6, line 40, change "non modal" to --non-modal--;

Signed and Sealed this

Eleventh Day of November, 1997

Attest:

BRUCE LEHMAN

Attesting Officer      Commissioner of Patents and Trademarks